(12) United States Patent
Lee

(10) Patent No.: US 10,760,198 B2
(45) Date of Patent: Sep. 1, 2020

(54) LAUNDRY TREATMENT MACHINE

(71) Applicant: LG ELECTRONICS INC., Seoul (KR)

(72) Inventor: Juhyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 211 days.

(21) Appl. No.: 15/964,664

(22) Filed: Apr. 27, 2018

(65) Prior Publication Data

US 2018/0313018 A1 Nov. 1, 2018

(30) Foreign Application Priority Data

Apr. 27, 2017 (KR) ........................ 10-2017-0054460

(51) Int. Cl.
| | | |
|---|---|---|
| *D06F 37/40* | (2006.01) | |
| *F16D 11/04* | (2006.01) | |
| *D06F 37/24* | (2006.01) | |
| *F16D 11/14* | (2006.01) | |
| *F16D 11/10* | (2006.01) | |
| *D06F 23/04* | (2006.01) | |
| *F16D 11/00* | (2006.01) | |

(52) U.S. Cl.
CPC .............. *D06F 37/40* (2013.01); *D06F 37/24* (2013.01); *F16D 11/04* (2013.01); *F16D 11/10* (2013.01); *F16D 11/14* (2013.01); *D06F 23/04* (2013.01); *F16D 2011/006* (2013.01)

(58) Field of Classification Search
None
See application file for complete search history.

(56) References Cited

U.S. PATENT DOCUMENTS

| 4,255,952 A | * | 3/1981 | Johnson | .................. D06F 37/40 |
|---|---|---|---|---|
| | | | | 192/18 R |
| 2004/0123632 A1 | | 7/2004 | Kim | |
| 2007/0028399 A1 | * | 2/2007 | Yoon | ...................... D06F 37/40 |
| | | | | 8/159 |
| 2016/0010265 A1 | | 1/2016 | Jang et al. | |
| 2016/0355967 A1 | | 12/2016 | Kim et al. | |
| 2017/0260679 A1 | * | 9/2017 | Carr | ....................... D06F 37/40 |

FOREIGN PATENT DOCUMENTS

| JP | 2004-209210 | 7/2004 |
|---|---|---|
| KR | 10-2004-0104979 | 12/2004 |
| KR | 10-2016-0142048 | 12/2016 |

OTHER PUBLICATIONS

International Search Report dated Aug. 29, 2018 issued in Application No. PCT/KR2018/004898 (Full English Text).

* cited by examiner

*Primary Examiner* — Cristi J Tate-Sims
(74) *Attorney, Agent, or Firm* — KED & Associates LLP

(57) ABSTRACT

The present disclosure relates to a laundry treatment machine. The laundry treatment machine according to an embodiment includes a coupling configured to transfer the driving force of a driving motor to the washing shaft or the dewatering shaft; a stopper engaged with the coupling and anchoring the dewatering shaft; a clutch motor configured to move the coupling; a ball stud protruding from the stopper toward the coupling and having a ball disposed at one end of the ball stud; and a clutch lever having a ball housing for receiving the ball of the ball stud and configured to move the coupling by the operation of the clutch motor.

18 Claims, 11 Drawing Sheets

LAUNDRY TREATMENT MACHINE

CROSS-REFERENCE TO RELATED APPLICATION

This application claims the priority under 35 U.S.C. § 119 to Korean Patent Application No. 10-2017-0054460, filed on Apr. 27, 2017 in the Korean Intellectual Property Office, whose entire the disclosure is hereby incorporated by reference.

BACKGROUND

1. Field

The present disclosure relates to a laundry treatment machine and, more particularly, to a top-loading type laundry treatment machine capable of easily operating a coupling.

2. Background

A laundry treatment machine washes laundry by friction force between the laundry and a washing tub rotating by the driving force of a motor, in a state where the laundry, wash water, and detergent are introduced into the washing tub, and thus the laundry has little damage and can be prevented from getting tangled.

The top-loading type laundry treatment machine can include a washing tub and a pulsator rotatably disposed at a lower portion of the washing tub. A coupling is engaged with a rotor bushing or a stopper so that the washing tub alone or both the wash tub and the pulsator can be rotated.

Meanwhile, if rotation moment is applied to the coupling in addition to an axial force, since a frictional resistance between the coupling and a dewatering shaft is larger than the driving force by a lever, there occurs a case where the coupling does not operate even when a clutch motor operates.

A shaking operation rotating the driving motor clockwise or counterclockwise may be performed for the operation of the coupling, and, if the coupling does not operate after the shaking operation is performed, and it operates in a state that switched from a washing mode into a dewatering mode, a shock can be imposed on the coupling being rotating and the stopper mounted on an outer tub and thus breakage thereof can be occurred.

BRIEF DESCRIPTION OF THE DRAWINGS

The embodiments will be described in detail with reference to the following drawings in which like reference numerals refer to like elements wherein.

DETAILED DESCRIPTION

Advantages, features and demonstration methods of the disclosure will be clarified through various embodiments described in more detail below with reference to the accompanying drawings. The disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims. Wherever possible, the same reference numbers will be used throughout the specification to refer to the same or like parts.

Hereinafter, a laundry treatment machine according to some embodiments will be described with reference to the accompanying drawings.

Figure 1:
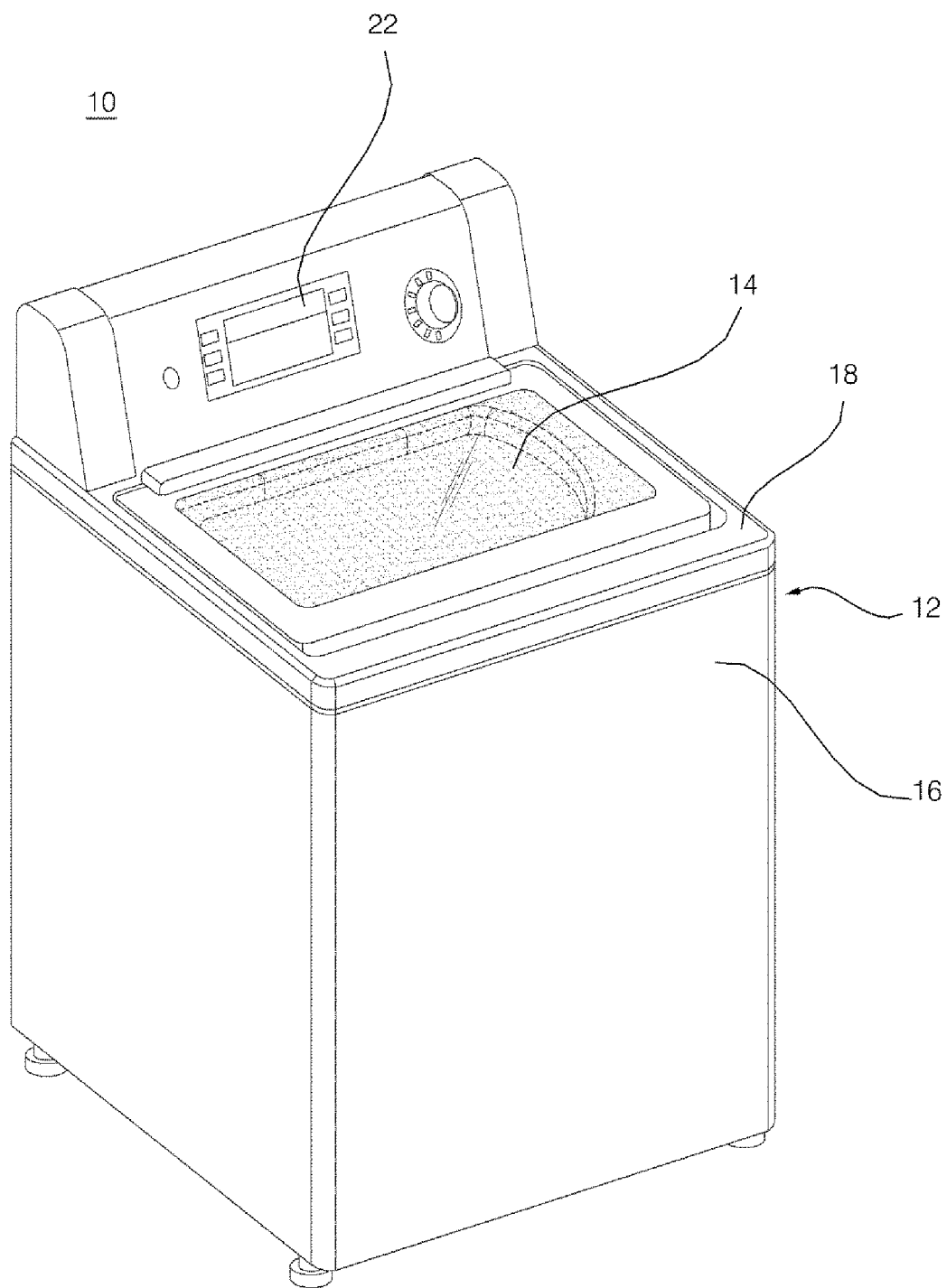
FIG. 1 is a perspective view illustrating a laundry treatment machine according to an embodiment of the present disclosure.
Figure 2:
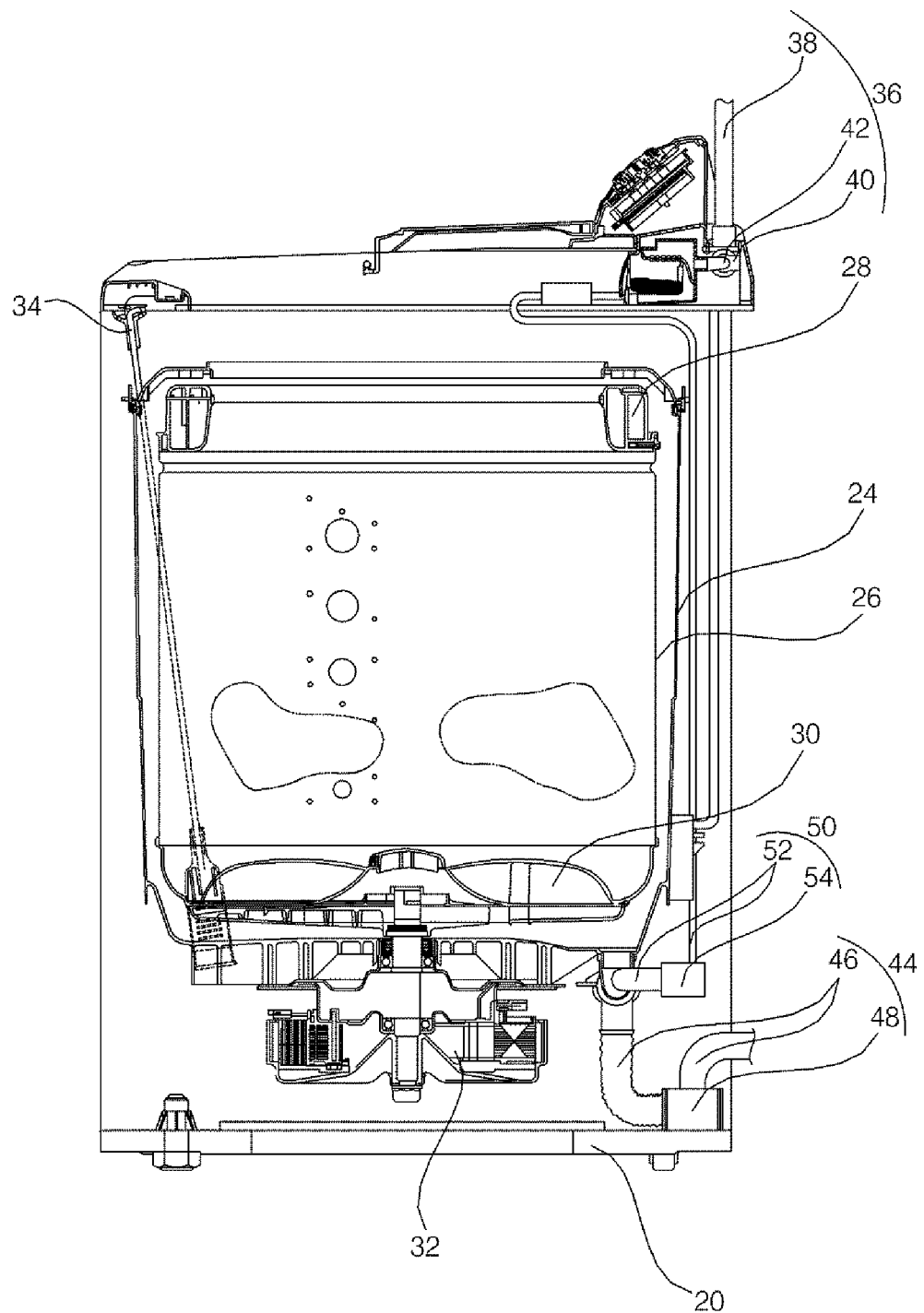
FIG. 2 is a view illustrating a schematic structure of the laundry treatment machine according to an embodiment of the present disclosure.

FIG. 1 is a perspective view illustrating a laundry treatment machine according to an embodiment of the present disclosure. FIG. 2 is a view illustrating a schematic structure of the laundry treatment machine according to an embodiment of the present disclosure.

Referring to FIGS. 1 and 2, the laundry treatment machine 10 according to embodiments of the present disclosure is a top-loading type laundry treatment machine 10 in which laundry is inserted into a washing tub through the upper part thereof. The top-loading type laundry treatment machine 10 includes a laundry treatment machine performing washing, rinsing and dewatering in a state where laundry is inserted, and a drying machine performing drying in a state where wet laundry is inserted. Hereinafter, such a laundry treatment machine 10 will be described in detail.

The laundry treatment machine 10 according to an embodiment includes a case 12 defining the external shape thereof, and a door 14 rotatably coupled to the case 12 and configured to move or rotate between the closed and open positions relative to a laundry entrance.

The case 12 includes a cabinet 16 having open top and bottom ends and configured to define the side surface of the machine 10, a top cover operably configured to cover the open top end of the cabinet 16 and a base 20 attached to the open bottom end of the cabinet 16.

The door 14 is configured to move or rotate between the closed and open positions relative to a laundry entrance At least a portion of the door 14 may include a transparent member such as a piece of glass so that the interior of a washing tub can be visible.

The laundry treatment machine 10 includes operating keys configured to receive control commands from a user, and a control panel equipped with any elements including a display configured to display information on an operation state of the laundry treatment machine 100 and configured to provide a user interface. The control panel 22 may be mounted on a portion of the top cover 18.

The laundry treatment machine 10 may include an outer tub 24 receiving wash water and an inner tub 26 rotatably positioned inside the outer tub 24 and receiving a laundry load. A balancer 28 may be positioned on an upper portion of the washing tub and configured to compensate eccentricity generated when the washing tub rotates. The laundry treatment machine 10 may include a pulsator or clothes mover 30 configured to induce rotational flow of the wash water contained in the outer tub 24. The pulsator 30 is disposed at a lower portion of the inner tub 26.

The laundry treatment machine 10 according to an embodiment includes a driving apparatus 32 configured to provide a driving force for rotating the inner tub 26 and/or the pulsator 30, and a clutch motor 64 configured to cause either the inner tub 26 or the pulsator 30 to rotate, or both the inner tub 26 and the pulsator 30 to rotate by selectively transferring the driving force of the driving apparatus 32. The clutch motor 64 is configured to move a coupling so that the pulsator 30 or the inner tub 26 can rotate.

The laundry treatment machine includes one or more suspension units 34 disposed on an upper portion of the inside of the cabinet 16 and hanging the outer tub 24. The one end of the suspension unit 34 may be coupled to an upper portion of the inside of the cabinet 16, and the other end thereof may be coupled to a lower portion of the outer tub 24. The suspension unit 34 may be coupled to the top cover 18 which is one of elements composing the case 12. However, the suspension unit of the present disclosure are not limited thereto, and it may be coupled to any portion of the case 12, such as a fixed portion thereof.

The laundry treatment machine 10 according to an embodiment includes a water supply assembly 36 configured to supply wash water into the inside of the outer tub 24, a drainage assembly 44 configured to discharge the wash water in the outer tub 24 after washing and dewatering have been completed, and a circulation assembly 50 configured to circulate the wash water in the outer tub 24 after washing or rinsing is performed to the inside of the inner tub 26 without discharging thereof.

The water supply assembly 36 includes an outer conduit 38 configured to introduce wash water from an external water supply into the laundry treatment machine 10, a water supply valve 40 connected to the outer conduit 38 and configured to control the supply of the wash water, and a water supply conduit 42 connecting the water supply valve 40 to a detergent supply unit. The water supply valve 40 and the water supply conduit 42 function as a supply flow path for supplying wash water.

The drainage assembly 44 includes a drainage conduit 46 disposed at the bottom surface of the outer tub 24 and functioning as a drainage flow path, and a drainage pump 48 configured to pump the wash water flowing through the drainage flow out of the laundry treatment machine 10. The drainage assembly 44 may be disposed between the base 20 and the outer tub 24.

The circulation assembly 50 includes a circulation conduit 52 functioning as a circulation flow path for causing the wash water inside the outer tub 24 after washing or rinsing is performed to be circulated to the inside of the inner tub 26 without discharging to the outside of the laundry treatment machine, and a circulation pump disposed on the circulation flow path and configured to pump the wash water. The circulation assembly 50 may be disposed between the cabinet 16 and the outer tub 24.

Figure 3:
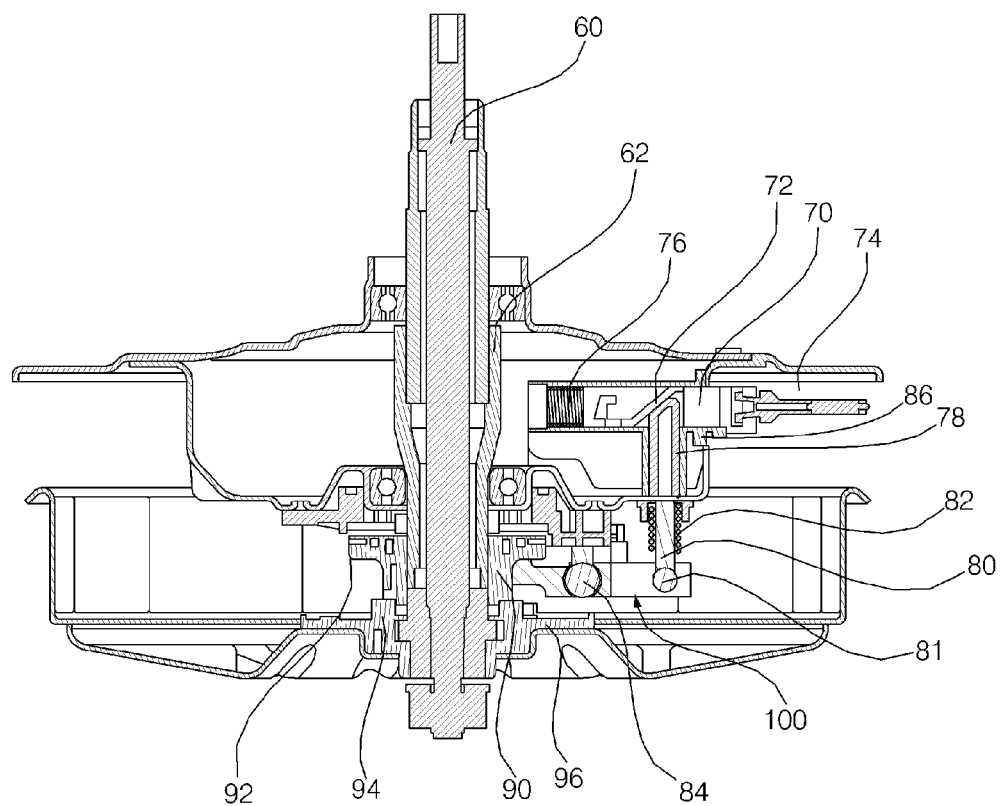
FIG. 3 is a view illustrating a driving apparatus, clutch, washing shaft and lever rotation axis of the laundry treatment machine according to an embodiment of the present disclosure.
Figure 4:
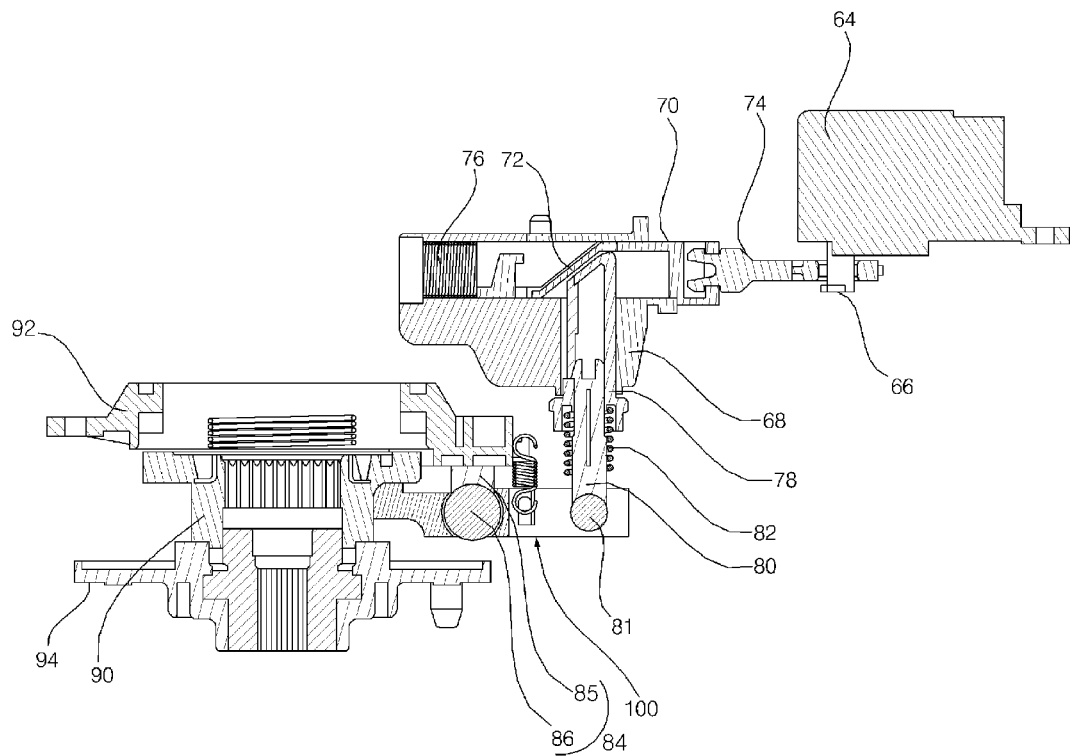
FIG. 4 is a view illustrating a clutch driving unit, clutch and coupling of the laundry treatment machine according to an embodiment of the present disclosure.
Figure 4:
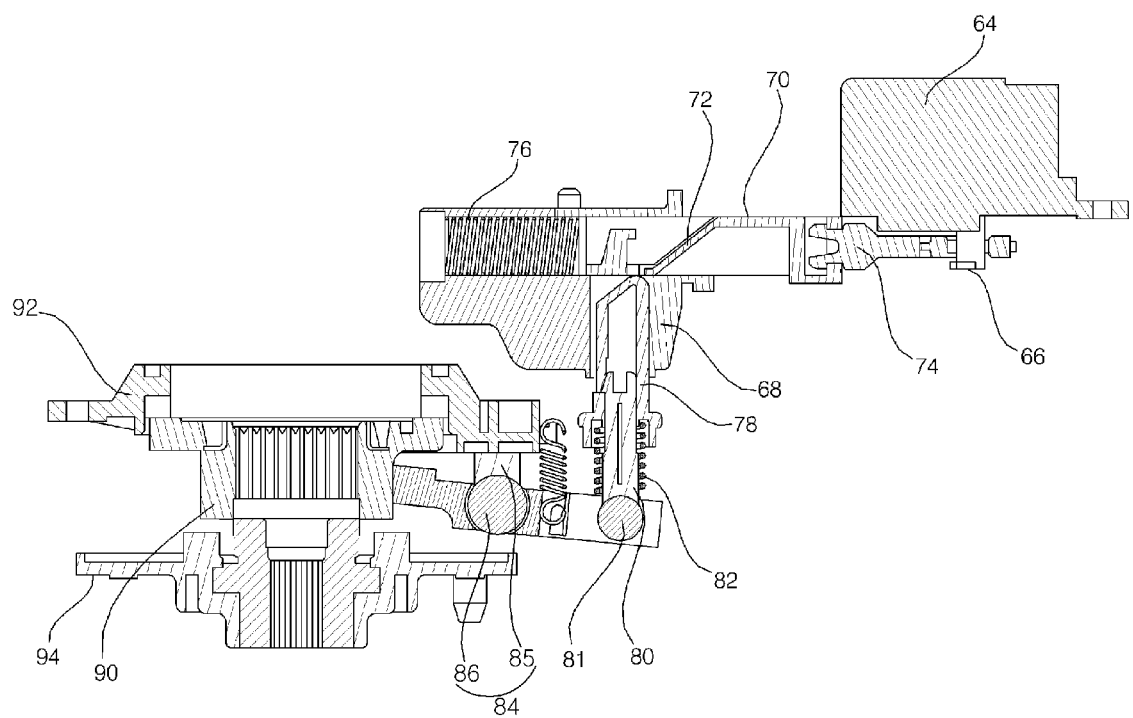

FIG. 3 is a view illustrating a driving apparatus, clutch, washing shaft and lever rotation axis of the laundry treatment machine according to an embodiment of the present disclosure. FIG. 4 is a view illustrating the relation between a clutch driving unit, clutch and coupling of the laundry treatment machine according to an embodiment of the present disclosure.

Referring to FIGS. 3 and 4, a driving apparatus 32 according to an embodiment is configured to rotate an inner tub 26 coupled to a dewatering shaft 62 or a pulsator 30 coupled to a washing shaft 60. The clutch is configured to cause a coupling 90 connected to the dewatering shaft 62 to engage with or disengage from a stopper 92 so that anchored is the dewatering shaft 62 or the washing shaft 60.

The laundry treatment machine according to an embodiment is configured to enable a clutch lever 100, 200 to move the coupling 90 upward or downward, by the rotational motion of a clutch motor 64. The clutch motor 64 is configured to rotate a cam shaft 66. A plunger link 70 positioned inside a plunger case 68 is configured to reciprocate in a straight line inside the plunger case 68 by the rotational motion of the cam shaft 66

The plunger link 70 is connected to the cam shaft 66 by a plunger connector 74. The plunger link 70 is connected to one side of a return spring 76, and the plunger spring is disposed inside the plunger case 68 and provides a return force to the plunger link 70. An inclined surface 72 is formed inside the plunger link 70 and contacts a sleeve 78 performing vertical motion inside the plunger case 68. With the inclined surface 72 formed inside the plunger link 70, the horizontal motion of the plunger link 70 is translated into the vertical motion of the sleeve 78.

The sleeve 78 is connected to a lever rod 80. The lever rod 80 is configured to move up and down depending on the movement of the sleeve 78. The lever rod 80 is connected to one end of the clutch lever 100 and configured to lift the other end of the clutch lever 100. A buffer spring 82 is disposed between the lever rod 80 and the sleeve 78. The buffer spring 82 is configured to function as a damper when a force resulted from the vertical motion of the sleeve 78 is imposed on the lever rod 80.

A lever rod ball 81 coupled to one end of the clutch lever 100 in a ball joint type is disposed on an end portion of the lever rod 80. The lever rod ball 81 is disposed on an end portion of the lever rod 80 and rotatably coupled to a lever rod ball housing 112 of the clutch lever 100 which will be described below.

A ball stud 84 providing an axis about which the clutch lever 100 according to an embodiment rotates protrudes from one side of the stopper. The ball stud 84 includes a ball 86 inserted in the ball housing 112 of the clutch lever and configured to cause the clutch lever 100 to rotate, and a stud 85 extending from a lower side of the stopper 92 and connecting the stopper 92 and the ball 86.

The laundry treatment machine is configured to move the coupling 90 by the clutch motor 64, by which an operation of the inner tub 26 or the pulsator 30 is stopped. The clutch motor 64 is a geared motor transferring power to a cam shaft 66 by decelerating through a reduction gear provided therein.

When the clutch motor 64 rotates, the clutch lever 100 is configured to cause the coupling 90 to engage with or disengage from the stopper 92. The clutch motor 64 according to an embodiment is configured to move the coupling 90 by rotating or stopping motion and then cause the coupling 90 to engage with or disengage from the stopper 92.

According to the laundry treatment machine 10 according to an embodiment, if the coupling 90 is engaged with the stopper 92, the dewatering shaft 62 is anchored and the washing shaft 60 rotates by a motor. In addition, when the coupling 90 is lowered, the coupling 90 is engaged with a rotor bushing 94 and then the dewatering shaft 62 and the washing shaft 60 rotate by the motor.

However, limitation is not imposed on this embodiment, and the coupling, stopper, clutch lever, and/or the like may be set so that either the dewatering shaft 62 or the washing shaft 60 rotates, or both the dewatering shaft 62 and washing shaft 60 rotate, depending on the movement of the coupling 90.

Figure 5:
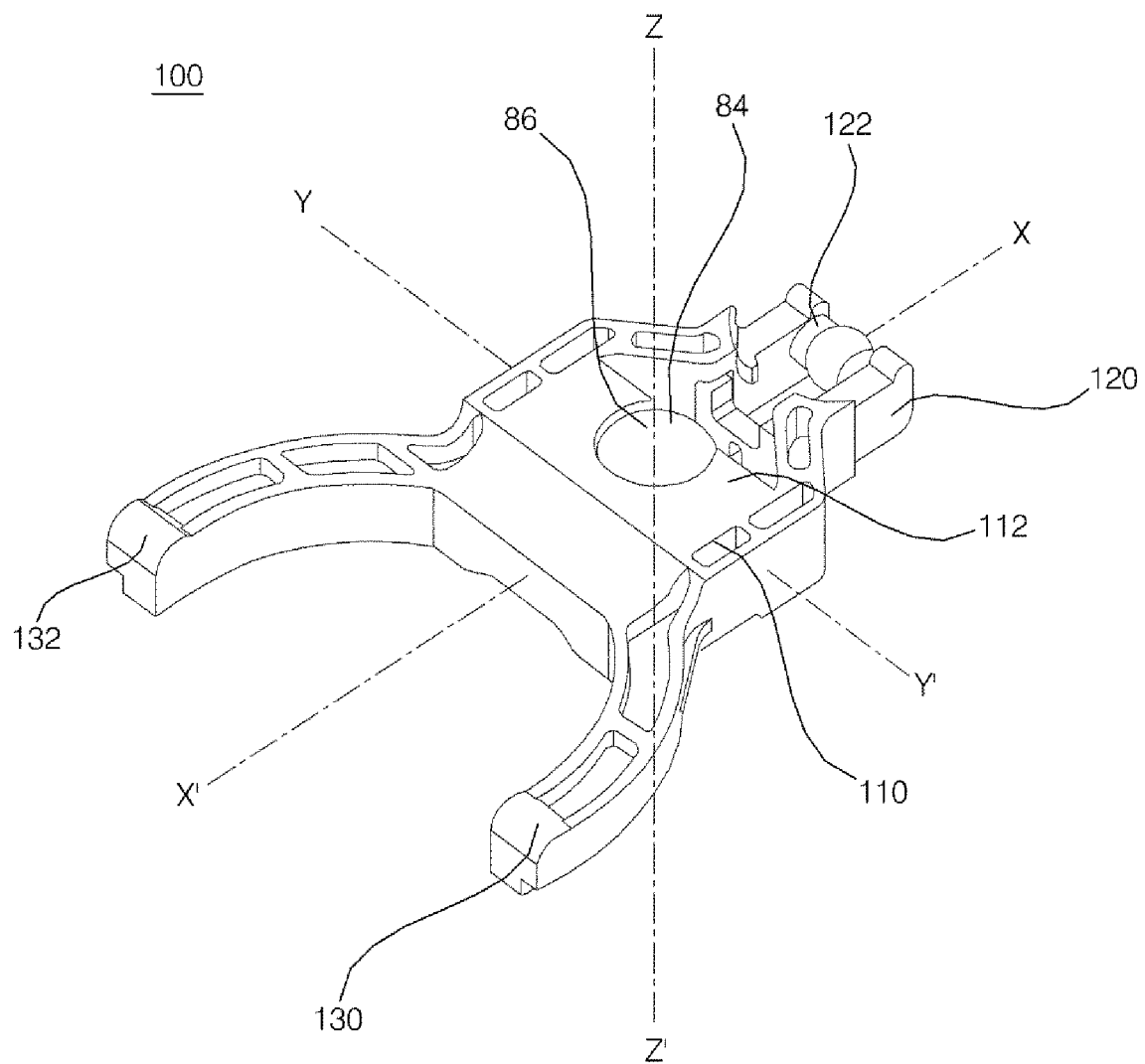
FIG. 5 is a perspective view illustrating a clutch lever according to an embodiment of the present disclosure.
Figure 6:
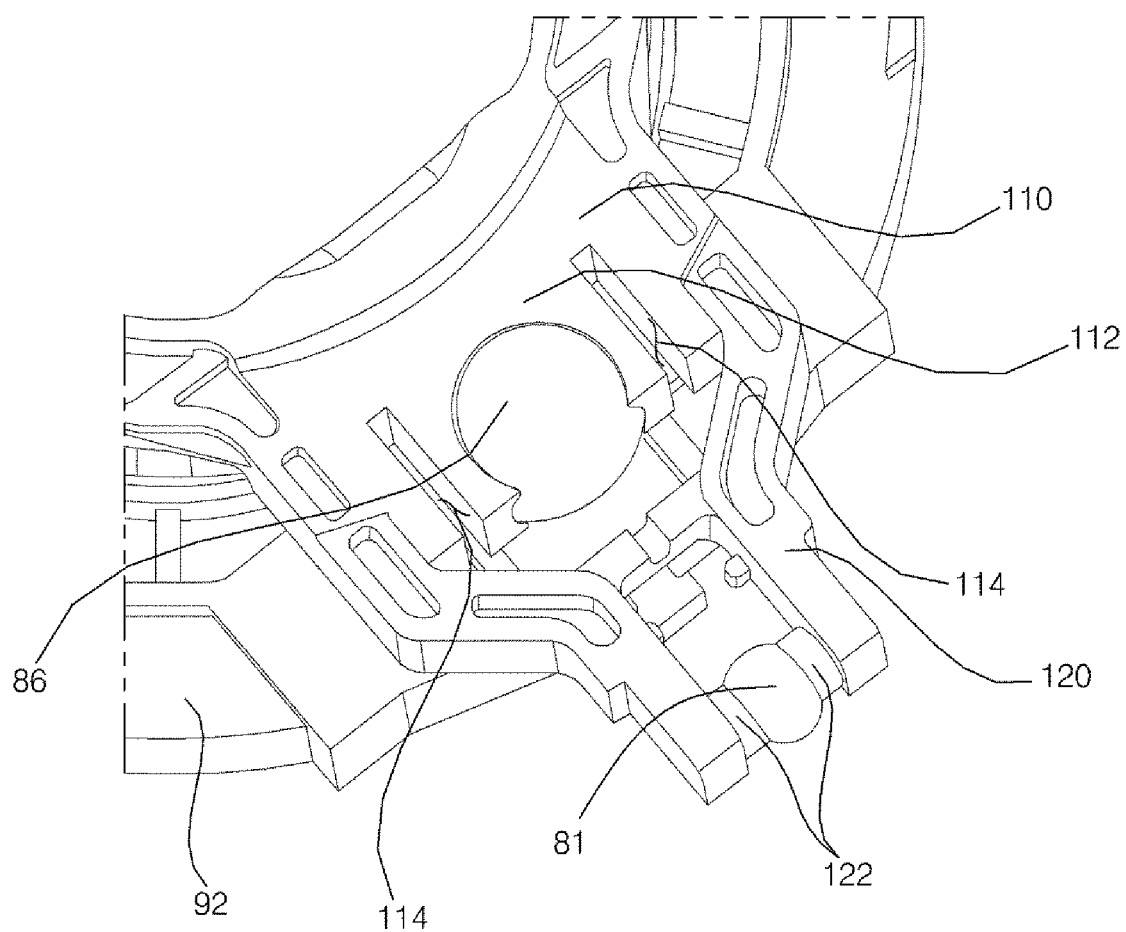
FIG. 6 is a view illustrating a clutch lever having an elastic deformation groove according to another embodiment of the present disclosure.

FIG. 5 is a perspective view illustrating a clutch lever according to an embodiment of the present disclosure. FIG. 6 is a view illustrating a clutch lever having an elastic deformation groove according to another embodiment of the present disclosure.

Hereinafter, referring to FIGS. 5 and 6, a clutch lever according to an embodiment will be described.

The laundry treatment machine according to an embodiment includes a coupling configured to transfer the driving force of a driving motor to the washing shaft or the dewatering shaft; a stopper engaged with the coupling and anchoring the dewatering shaft; a clutch motor configured to move the coupling; a ball stud protruding from the stopper toward the coupling and having a ball disposed at one end of the ball stud; and a clutch lever having a ball housing for receiving the ball of the ball stud and configured to move the coupling by the operation of the clutch motor.

The clutch lever 100 according to an embodiment is rotatably coupled to the ball stud 84 in ball joint type. The clutch lever 100 according to an embodiment rotates with three rotational degrees of freedom (X-X', Y-Y', Z-Z').

The clutch lever 100 according to an embodiment includes a lever body 110 connected to the ball stud extending from the stopper, a lever rod connection unit 120 extending from one end of the lever body 110 and connected to a lever rod 80, and a pair of levers 130 and 132 extending from the other end of the lever body 110 and configured to lift the coupling 90 by power transferred from the lever rod connection unit 120.

The clutch lever 100 performs seesaw motion relative to the ball 86 inserted inside the ball housing 112 of the lever body 110 as a whole. Accordingly, if one end of the lever rod connection unit 120 is pushed by the lever rod 80, the coupling 90 is lifted by rising of the end portions of the pair of levers 130 and 132.

According to an embodiment, the lever rod connection unit 120 is extending from the one end of the lever body 110, and the pair of levers 130 and 132 are extending from the other end of the lever body 110. The lever body 110 has the ball housing 112 for receiving the ball 86 of the ball stud 84.

The ball housing 112 has a shape corresponding to the external shape of the ball 86 for receiving the ball 86. The ball housing 112 has a shape in which the clutch lever 100 performs rotational motion relative to the ball 86. Referring to FIG. 6, the lever body 110 may have an elastic deformation groove 114 spaced a certain distance apart from the ball housing 112 and capable of elastically deforming the circumference of the ball housing 112. The elastic deformation groove 114 causes at least one portion of the circumference of the ball housing 112 to be elastically deformed and thus the ball 86 formed at one end of the ball stud to be easily inserted inside the ball housing 112.

The clutch lever 100 according to an embodiment is rotatably coupled to the ball stud 84 in ball joint type. The ball joint type means a coupling mechanism in which a ball in the shape of a sphere is rotatably supported by a housing having a shape that surrounds at least a part of an outer circumference of the ball.

The clutch lever 100 may rotate with three rotational degrees of freedom relative to the ball 86. The clutch lever 100 can rotate about a lever rotation axis Y-Y' functioning as a reference for rotating of the clutch lever 100 by the lever rod 80, relative to the center of the ball, a symmetrical rotation axis X-X' formed in the symmetrical center of the clutch lever 100 having a symmetrical structure, and a ball stud axis Z-Z' formed in a direction in which the ball stud 84 extends.

The clutch lever 100 generally rotates and performs seesaw motion, about the lever rotation axis Y-Y'. If one end of the lever rod connection unit 120 is pushed by the lever rod 80, the end portions of a first lever 130 and a second lever 132 rise relative to the lever rotation axis and thus the clutch lever 100 lifts the coupling 90.

The clutch lever 100 according to an embodiment can also rotate about the symmetrical rotation axis X-X, by a joint structure of the ball joint type.

The clutch lever 100 according to an embodiment is extending rearward from the lever body 110 and includes the lever rod connection unit 120 connected to the lever rod 80. The lever rod connection unit 120 is coupled to the lever rod 80 in the ball joint type.

A lever rod ball 81 is disposed on an end portion of the lever rod 80 and the lever rod connection unit 120 is rotatably coupled to the lever rod ball 81. A lever rod ball housing 112 which surrounds at least a portion of the lever rod ball 81 is formed on an end portion of the lever rod connection unit 120. The circumference of the lever rod ball 81 is disposed on the lever rod ball housing 112. The lever rod ball housing 112 is disposed on both end sides of the lever rod ball 81 relative to the symmetrical rotation axis X-X', and thus connected to the lever rod ball 81.

The lever rod ball 81 and the ball 86 enable the clutch lever 100 to rotate about the symmetrical rotation axis X-X'. The lever rod connection unit 120 is coupled to a lever rod in the ball joint type and enables the clutch lever 100 to rotate about the symmetrical rotation axis.

The clutch lever 100 according to an embodiment is extending forward from the lever body 110 and includes a pair of levers 130 and 132 connected to the coupling. A pair of levers 130 and 132 may be divided into a first lever 130 and a second lever 132. The first and second levers according to an embodiment are symmetrically disposed relative to the symmetrical rotation axis X-X' of the lever body 110. The first and second levers according to an embodiment have a symmetrical shape relative to the symmetrical rotation axis X-X' of the lever body 110. The first and second levers move the coupling 90 up and down when the lever body 110 rotates about the lever rotation axis Y-Y'.

Figure 7A:
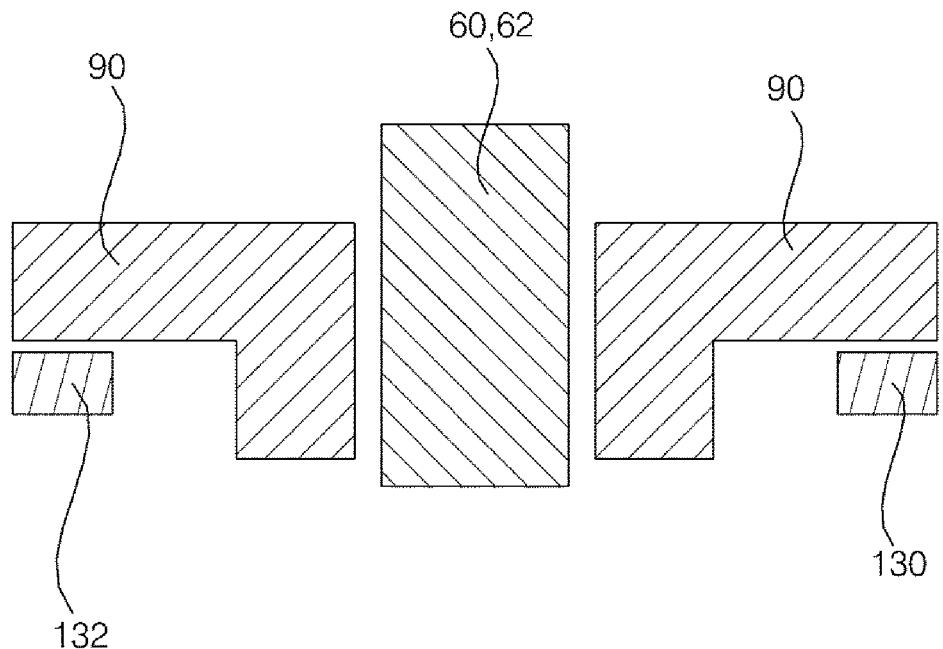
FIG. 7A is a schematic view illustrating an initial state where a clutch lever lifts a coupling in a case where the coupling is arranged horizontally according to an embodiment of the present disclosure.

FIG. 7a is a schematic view illustrating an initial state where a clutch lever lifts a coupling in a case where the coupling is arranged horizontally according to an embodiment of the present disclosure. FIG. 8 is a view illustrating a process in which the clutch lever lifts the coupling in a case where the coupling is not arranged horizontally.

Hereinafter, referring to FIGS. 7 and 8, the operation of the clutch lever according to an embodiment will be described.

If the lever rod pushes downward the lever rod connection unit of the clutch lever by the operation of a clutch motor 64, the clutch lever 100 rotates about the lever rotation axis Y-Y' forming the center of the ball and lifts the coupling 90.

Figure 7B:
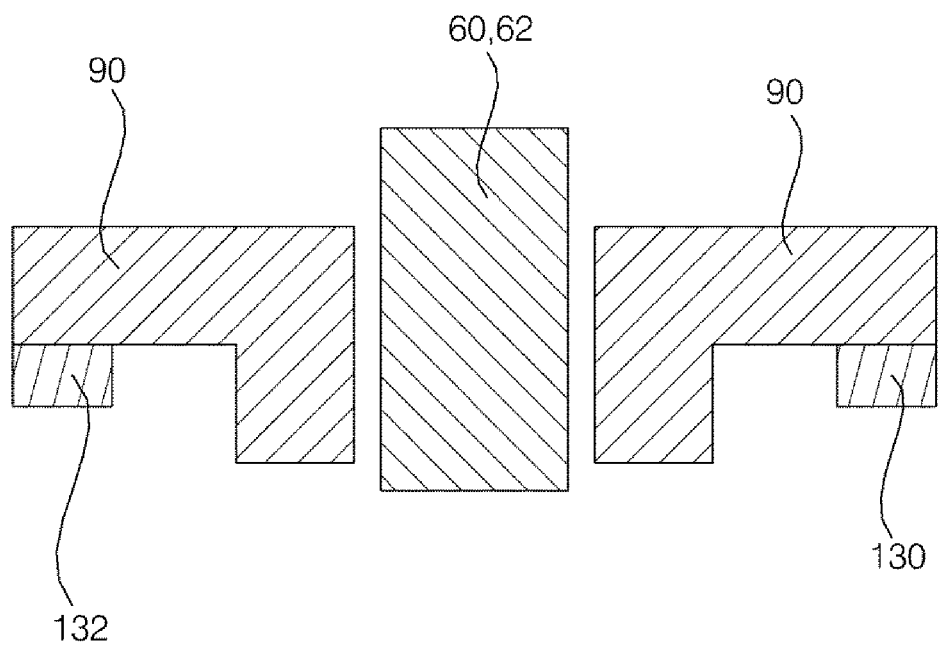
FIG. 7B is a schematic view illustrating a state where the clutch lever contacts the coupling while the clutch lever lifts the coupling in a case where the coupling is arranged horizontally according to an embodiment of the present disclosure.

Referring to FIGS. 7a and 7b, in a case where the coupling 90 is arranged horizontally, the clutch lever 100 rotates about the lever rotation axis Y-Y' forming the center of the ball, and the end portions of the first lever 130 and second lever 132 contact the coupling at the same time.

Thereafter, when the lever rod 80 further pushes downward the lever rod connection unit 120 of the clutch lever 100, the clutch lever 100 further rotates about the lever rotation axis Y-Y', and thereby the first and second levers 130 and 132 lift the coupling 90 so that the coupling engages with the stopper 92.

Figure 8A:
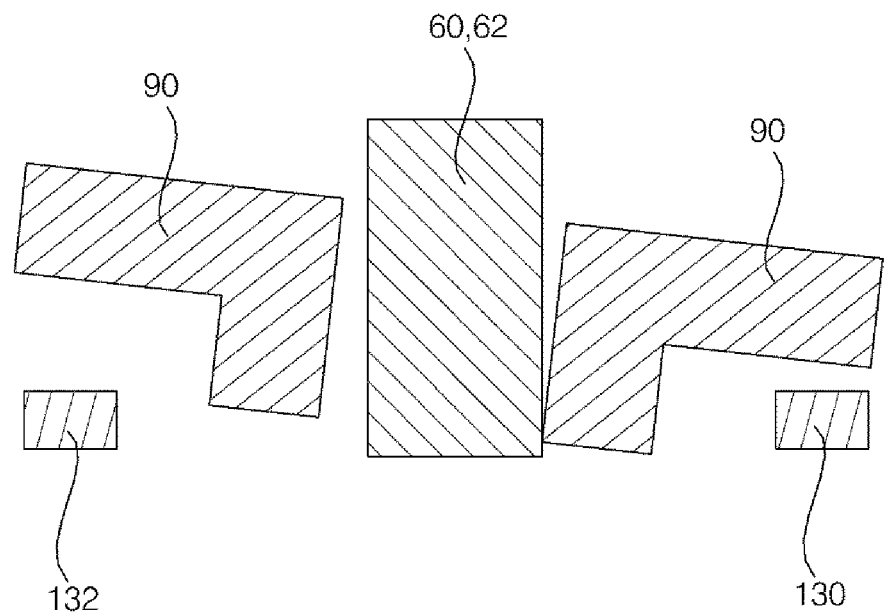
FIG. 8A is a schematic view illustrating an initial state where the clutch lever lifts the coupling in a case where the coupling is not arranged horizontally according to an embodiment of the present disclosure.
Figure 8B:
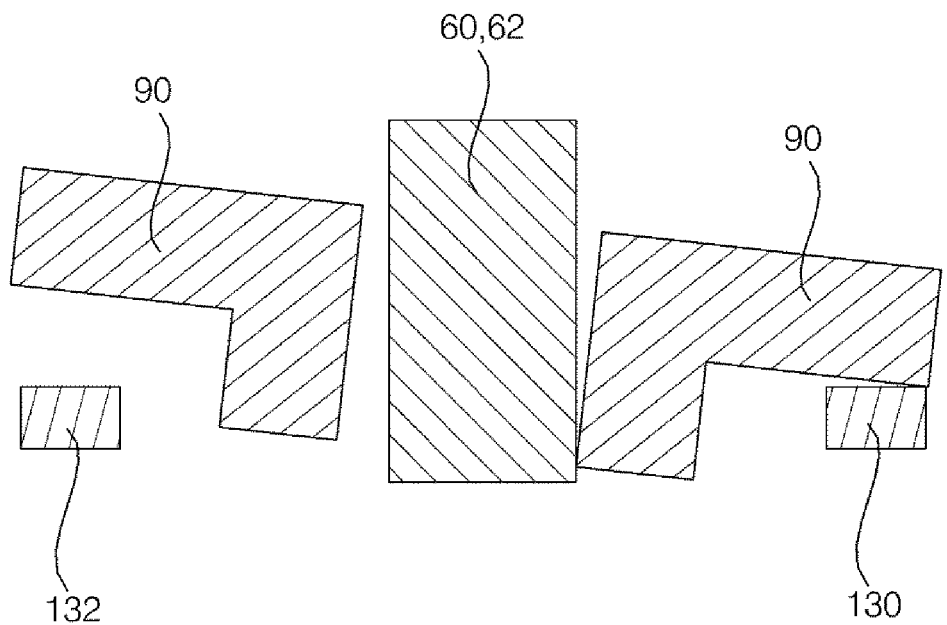
FIG. 8B is a schematic view illustrating a state where a lever of the clutch lever contacts the coupling while the clutch lever lifts the coupling in a case where the coupling is not arranged horizontally according to an embodiment of the present disclosure.
Figure 8C:
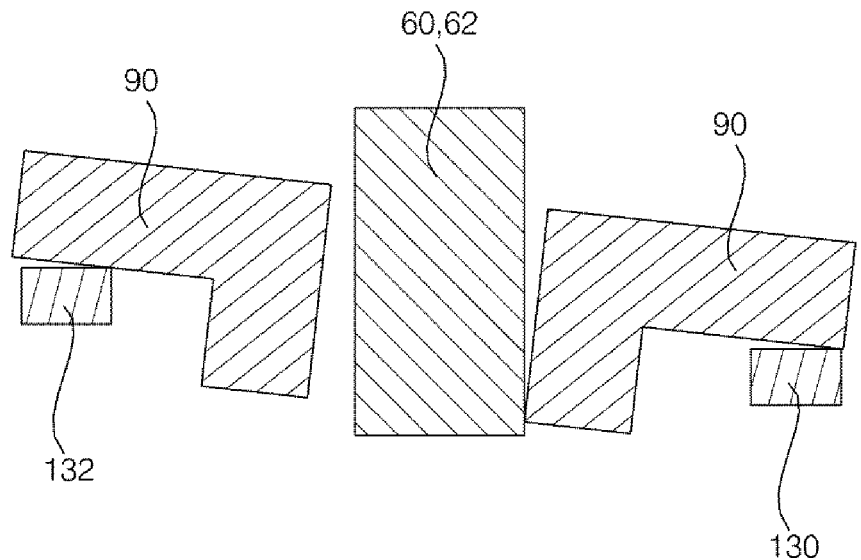
FIG. 8C is a schematic view illustrating a state where two levers of the clutch lever contact the coupling by the rotating of a gear while the clutch lever lifts the coupling in a case where the coupling is not arranged horizontally according to an embodiment of the present disclosure.

Referring to FIGS. 8a to 8c, in a case where the coupling is not arranged horizontally in its operation process, the clutch lever 100 rotates about the lever rotation axis Y-Y' forming the center of the ball, and moves until any one of the end portions of the first and second levers 130 and 132 contacts the lower side of the coupling 90.

In this case, as illustrated in FIG. 8b, the clutch lever 100 rotates about the symmetrical rotation axis X-X' if any one of the end portions of the first and second levers 130 and 132 contacts the lower side of the coupling 90, and rotates until the other of the end portions of the first and second levers 130 and 132 contacts the lower side of the coupling. The lever rod ball 81 and the ball 86 enable the clutch lever 100 to rotate about the symmetrical rotation axis X-X'.

As illustrated in FIG. 8C, if the clutch lever 100 rotates about the symmetrical rotation axis X-X' and as a result, both the first lever 130 and second lever 132 contact the lower side of the coupling, the clutch lever 100 rotates about the lever rotation axis Y-Y' again and the first and second levers 130 and 132 lift the coupling upward, and then the coupling 90 is engaged with the topper 92.

As illustrated in FIGS. 7 to 8, the clutch lever according to the embodiment can easily move the coupling without depending on the arrangement of the coupling. Accordingly, the clutch lever according to the embodiment can easily move the coupling even if the coupling is not arranged horizontally as a result of the occurring of rotation moment.

Figure 9:
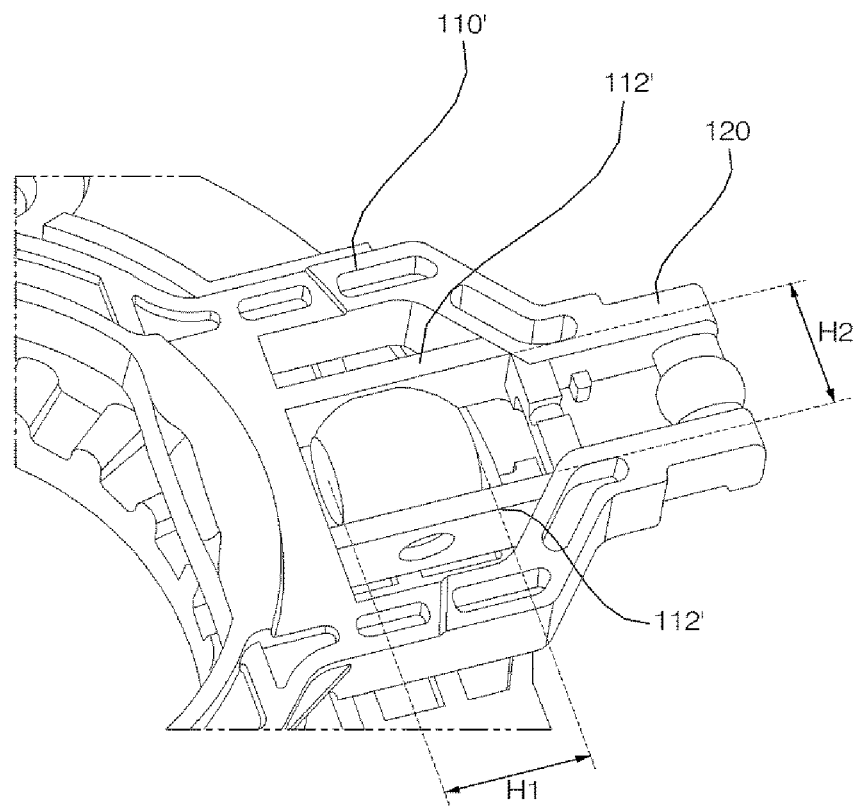
FIG. 9 is a view illustrating a clutch lever and a ball stud according to another embodiment of the present disclosure.
Figure 10:
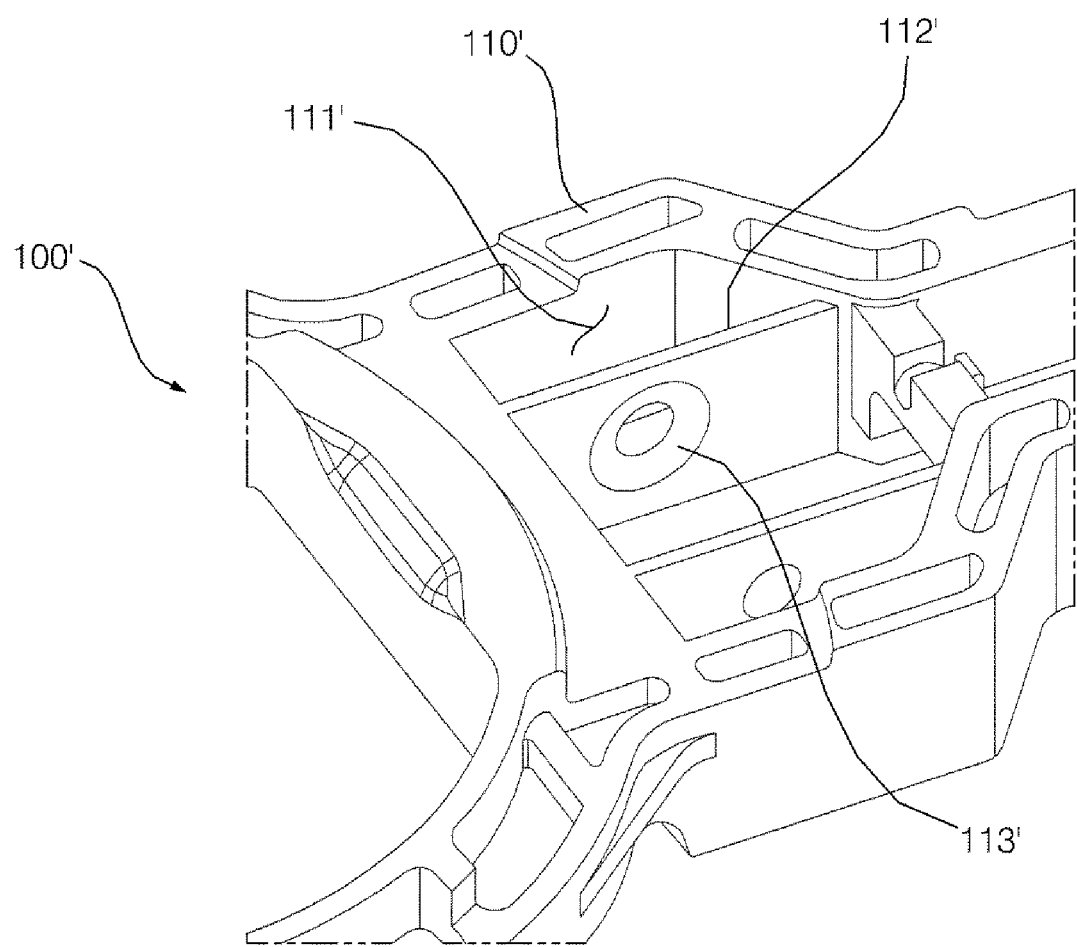
FIG. 10 is a view illustrating the clutch lever of FIG. 9 according to an embodiment of the present disclosure.
Figure 11:
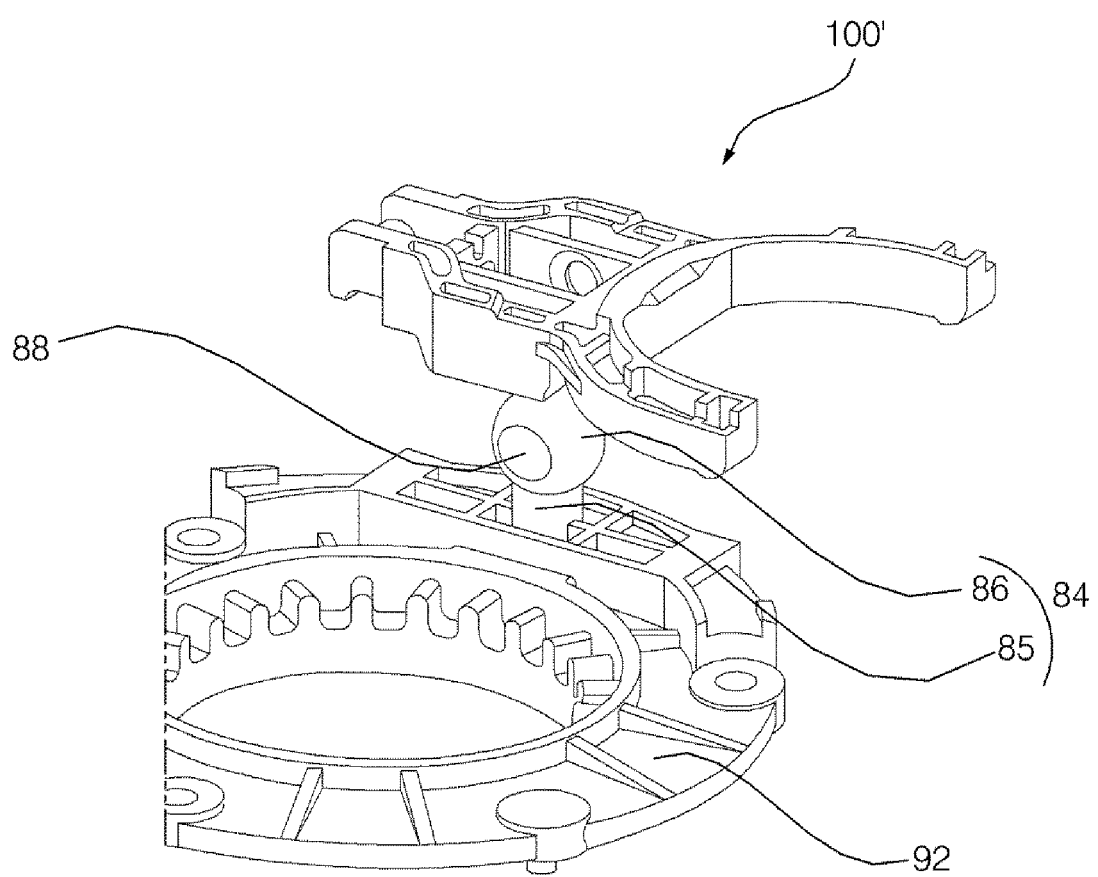
FIG. 11 is a view illustrating a state where the clutch lever and the ball stud of FIG. 9 are coupled to each other according to an embodiment of the present disclosure.

FIG. 9 is a view illustrating a clutch lever and a ball stud according to another embodiment of the present disclosure. FIG. 10 is a view illustrating the clutch lever of FIG. 9 according to an embodiment of the present disclosure. FIG. 11 is a view illustrating a state where the clutch lever and the ball stud of FIG. 9 are coupled with each other according to an embodiment of the present disclosure.

Hereinafter, referring to FIGS. 9 to 11, the clutch lever and the ball stud will be described.

Referring to FIG. 9, the lever body 110' according to an embodiment has a hole 111' defined by an open top and bottom, and a pair of ball housing bars 112' rotatably supporting the ball of the ball stud are disposed in the hole 111'. The one pair of ball housing bars 112' according to an embodiment is formed into a bar type in the hole 111'.

The one pair of ball housing bars 112' according to an embodiment is arranged in parallel at a certain interval in the hole 111'. The ball 86 of the ball stud 84 is arranged between the one pair of ball housing bars 112'. Each of the one pair of ball housing bars 112' has a receiving groove 113' for receiving at least a portion of the ball 86 of the ball stud 84. Each of the one pair of ball housing bars 112' has a receiving groove 113' for supporting and receiving at least the ball 86 of the ball stud 84.

According to an embodiment, the ball 86 formed on one end of the ball stud 84 has cut portions 88 which are formed on one side of the ball and the other side formed on the opposite side to the one side. The cut portions 88 are formed on one side surface facing the washing shaft and the other side surface formed on the opposite side to the one side surface.

A length (H1) between the cut portion 88 formed on one side surface of the ball 86 and the cut portion 88 formed on the other side surface is less than or equals to a length (H2) between the one pair of ball housing bars 112'. Accordingly, as illustrated in FIG. 11, the clutch lever 100' is connected to the ball housing bars 112' through the circumference of the ball on which the cut portions 88 are formed and thus the clutch lever 100' can be easily connected to the ball stud 84. Meanwhile, when the clutch lever 100 is operated, the circumference surface, not the cut portions 88 of the ball 86, is received and supported at receiving grooves 113' of the ball housing bars 112' and thus the clutch lever 100' can rotate relative to ball.

It is an object of the present disclosure to provide a laundry treatment machine in which a coupling is moved in a stable manner.

It is another object of the present disclosure to provide a laundry treatment machine in which a clutch lever is easily mounted.

Objects of the present disclosure are not limited to the above objects and other objects not described will be clearly understood by those skilled in the art from the following description.

In some embodiments of the present disclosure, the above and other objects can be accomplished by the provision of a laundry treatment machine comprising a coupling transferring the driving force of a motor to a washing shaft or a dewatering shaft; a stopper anchoring the dewatering shaft by being engaged with the coupling; a clutch motor moving the coupling; a ball stud protruding from the stopper to the direction of the coupling and having a ball disposed at one end of the ball stud; and a clutch lever having a ball housing in which the ball of the ball stud is received and moving the coupling by the operating of the clutch motor. The clutch lever may be rotatably coupled to the ball stud in a ball joint type and then it can rotate with three rotational degrees of freedom relative to the ball.

In addition, the laundry treatment machine according to an embodiment of the present disclosure further includes a lever rod transferring force generated by the clutch motor to the clutch lever and having a lever rod ball disposed at an end portion of the lever rod. The clutch lever may be rotatably coupled to the lever rod in the ball joint type and thus it can rotate about a symmetrical rotation axis.

The clutch lever according to an embodiment of the present disclosure includes a lever body in which the ball housing is formed for receiving a portion of a ball disposed at an end portion of the ball stud; a lever rod connection unit extending from one end of the lever body and connected to the lever rod; and a pair of levers extending from the other end of the lever body and moving the coupling by the power transferred through the lever rod connection unit. The lever body is provided with an elastic deformation groove spaced a certain distance apart from the ball housing and capable of elastically deforming the circumference of the ball housing and enables the clutch lever to easily couple to the ball stud.

The clutch lever according to an embodiment of the present disclosure has a hole defined by an open top and bottom, and a pair of ball housing bars which rotatably support the ball of the ball stud are disposed in the hole. Each of the ball housing bars has a receiving groove for receiving a portion of the ball of the ball stud and thus the clutch lever can be stably coupled to the ball stud.

The ball has cut portions which are formed on one side surface facing the washing shaft and the other side surface formed on the opposite side to the one side surface and which are cut perpendicularly to the ball housing bar, and a length between the cut portions may be less than or equal to a length between a pair of ball housing bars. Thus, the clutch lever can be easily coupled to the ball stud.

In the laundry treatment machine according to the embodiments, the clutch lever has the ball housing for receiving the ball of the ball stud and moves the coupling by the operation of the clutch motor in a state where the clutch lever is rotatably coupled to the ball stud in ball joint type. Since the clutch lever can rotate with three rotational degrees of freedom, it moves the coupling stably, and a shock imposed on the coupling or the stopper can be prevented.

In the laundry treatment machine according to the embodiments, cut portions are formed on the ball stud and receiving grooves are formed on ball housing bars of the clutch lever. Thus, the clutch lever can be easily installed.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A laundry treatment machine comprising:
   a coupling that transfers a driving force to a dehydration shaft or a washing shaft;
   a rotor bushing that, when engaged with the coupling, rotates both the dehydration shaft and the washing shaft, and rotates only the washing shaft when not engaged with the coupling;
a stopper spaced upwardly on the rotor bushing;
a clutch motor that moves the coupling;
a ball stud that protrudes downward from the stopper, and a ball is provided at one end of the ball stud;
a clutch lever to move the coupling based on operation of the clutch motor, the clutch lever having a ball housing for receiving the ball; and
a lever rod that transfers force from the clutch motor to the clutch lever,
wherein the clutch lever includes:
  a lever body having the ball housing for receiving a portion of the ball of the ball stud;
  a lever rod connection unit that extends from a first end of the lever body, and is coupled to the lever rod; and
  a pair of levers that extend from a second end of the lever body to move the coupling based on power from the lever rod connection unit.

2. The laundry treatment machine according to claim 1, wherein the clutch lever is coupled to the ball stud in a ball joint type coupling mechanism.

3. The laundry treatment machine according to claim 1, further comprising:
a lever rod ball provided at an end portion of the lever rod, wherein the clutch lever is coupled to the ball stud in a ball joint type coupling mechanism.

4. The laundry treatment machine according to claim 1, wherein the ball housing has a shape that corresponds to an external portion of the ball of the ball stud,
wherein the lever body includes an elastic deformation groove spaced apart from the ball housing, and the elastic deformation groove is to elastically deform a portion of the ball housing.

5. The laundry treatment machine according to claim 1, wherein the lever rod connection unit includes a lever rod ball housing that corresponds to a portion of the lever rod ball.

6. The laundry treatment machine according to claim 1, wherein the lever body includes a hole having an open top and bottom, and a pair of ball housing bars rotatably supporting the ball of the ball stud are provided at the hole.

7. The laundry treatment machine according to claim 6, wherein each of the housing bars separately includes a receiving groove for receiving a corresponding portion of the ball of the ball stud.

8. The laundry treatment machine according to claim 6, wherein the ball has first and second cut portions, and the first cut portion is provided by cutting a first side surface of the ball facing the washing shaft and the second cut portion is provided by cutting a second side surface of the ball, wherein the first and second cut portions are perpendicular to the ball housing bars.

9. The laundry treatment machine according to claim 8, wherein a distance between the first cut portion on the first side surface of the ball and the second cut portion on the second side surface of the ball is less than or equal to a distance between the housing bars.

10. The laundry treatment machine according to claim 1, wherein the clutch motor to move the coupling such that a tub is rotated about the dehydration shaft.

11. A laundry treatment machine comprising:
an outer tub receiving wash water;
an inner tub rotatably positioned inside the outer tub;
a pulsator configured to induce rotational flow of the wash water contained in the outer tub;
a washing shaft connected to the pulsator;
a dewatering shaft connected to the inner tub;
a driving apparatus to rotate the inner tub connected to the dewatering shaft or the pulsator connected to the washing shaft, wherein the driving apparatus includes:
  a coupling device that transfers a driving force to the washing shaft or the dewatering shaft;
  a rotor bushing that, when engaged with the coupling device, rotates both the dewatering shaft and the washing shaft, and rotates only the washing shaft when not engaged with the coupling device;
  a stopper spaced upwardly on the rotor bushing;
  a clutch motor that causes the coupling device to engage with or disengage with the stopper;
  a ball stud that protrudes downward from the stopper, and a ball is provided at one end of the ball stud;
  a clutch lever to move the coupling device relative to the dewatering shaft based on operation of the clutch motor, the clutch lever including a ball housing for receiving the ball; and
a lever rod that transfers force from the clutch motor to the clutch lever,
wherein the clutch lever includes:
  a lever body having the ball housing for receiving a portion of the ball of the ball stud;
  a lever rod connection unit that extends from a first end of the lever body, and is coupled to the lever rod; and
  a pair of levers that extend from a second end of the lever body to move the coupling device based on power from the lever rod connection unit.

12. The laundry treatment machine according to claim 11, wherein the clutch lever is coupled to the ball stud in a ball joint type coupling mechanism.

13. The laundry treatment machine according to claim 11, further comprising:
a lever rod ball provided at an end portion of the lever rod, wherein the clutch lever is coupled to the ball stud in a ball joint type coupling mechanism.

14. The laundry treatment machine according to claim 11, wherein the ball housing has a shape that corresponds to at least a portion of the ball of the ball stud,
wherein the lever body includes an elastic deformation groove spaced apart from the ball housing, and the elastic deformation groove is to elastically deform a portion of the ball housing.

15. The laundry treatment machine according to claim 11, wherein the lever rod connection unit includes a lever rod ball housing that corresponds to at least a portion of the lever rod ball.

16. The laundry treatment machine according to claim 11, wherein the lever body includes a hole having an open top and bottom, and a pair of ball housing bars rotatably supporting the ball of the ball stud are provided at the hole.

17. The laundry treatment machine according to claim 16, wherein each of the housing bars separately includes a receiving groove for receiving a corresponding portion of the ball of the ball stud.

18. The laundry treatment machine according to claim 16, wherein the ball has first and second cut portions, and the first cut portion is provided by cutting a first side surface of the ball facing the washing shaft and the second cut portion is provided by cutting a second side surface of the ball, wherein the first and second cut portions are perpendicular to the ball housing bars.

* * * * *